United States Patent [19]

Inaba et al.

[11] Patent Number: 4,891,002
[45] Date of Patent: Jan. 2, 1990

[54] PRODUCT EJECTOR FOR INJECTION MOLDING MACHINE

[75] Inventors: Yoshiharu Inaba, Kawasaki; Shigeo Tokunaga, Hino, both of Japan

[73] Assignee: Fanuc Ltd., Minamitsuru, Japan

[21] Appl. No.: 204,554

[22] PCT Filed: Oct. 16, 1987

[86] PCT No.: PCT/JP87/00797
§ 371 Date: Apr. 15, 1988
§ 102(e) Date: Apr. 15, 1988

[87] PCT Pub. No.: WO88/03471
PCT Pub. Date: May 19, 1988

[30] Foreign Application Priority Data
Nov. 5, 1986 [JP] Japan ................. 61-261929

[51] Int. Cl.⁴ ............... B29C 45/42; B29C 45/66; B28B 7/10
[52] U.S. Cl. ..................... 425/556; 249/67; 249/68; 425/554; 425/444; 425/451.9; 425/441; 264/334
[58] Field of Search ............. 425/554, 556, 438, 441, 425/443, 444, 450.1, 451.9, 185, DIG. 247, DIG. 221, DIG. 223, 542; 249/66.1, 67, 68, 74.75; 264/328.1

[56] References Cited

U.S. PATENT DOCUMENTS

| | | | |
|---|---|---|---|
| 3,158,905 | 12/1964 | Havlik | 425/554 |
| 3,388,431 | 6/1968 | Aoki | 425/556 |
| 3,669,593 | 6/1972 | Cyriax | 425/186 |
| 3,702,750 | 11/1972 | Veneria | 425/556 |

FOREIGN PATENT DOCUMENTS

| | | | |
|---|---|---|---|
| 2414998 | 9/1979 | France | 425/554 |
| 37-12134 | 8/1962 | Japan | 425/556 |
| 59-24311 | 2/1984 | Japan . | |
| 62-80016 | 4/1987 | Japan | 425/556 |

Primary Examiner—Jeffery Thurlow
Assistant Examiner—Mathieu Vargot
Attorney, Agent, or Firm—Staas & Halsey

[57] ABSTRACT

A product ejector in a motor-driven, direct-acting type hydraulic mold clamping system, which includes a rod mounted on a ball screw for driving a moving platen at a forward end of the screw on the side of the platen, so that the rod is immovable axially and engageable with and disengageable from an ejector plate attached to an ejector bar slidably arranged within a bore in the platen. When the platen moves rearwardly, the ejector plate, moving together with the platen, is abutted against the rod. As the platen moves farther rearwardly, the rod causes the ejector bar to project into a mold mounted to the platen, against the force of a spring inteposed between the ejector plate and the platen, to eject a molded article.

14 Claims, 1 Drawing Sheet

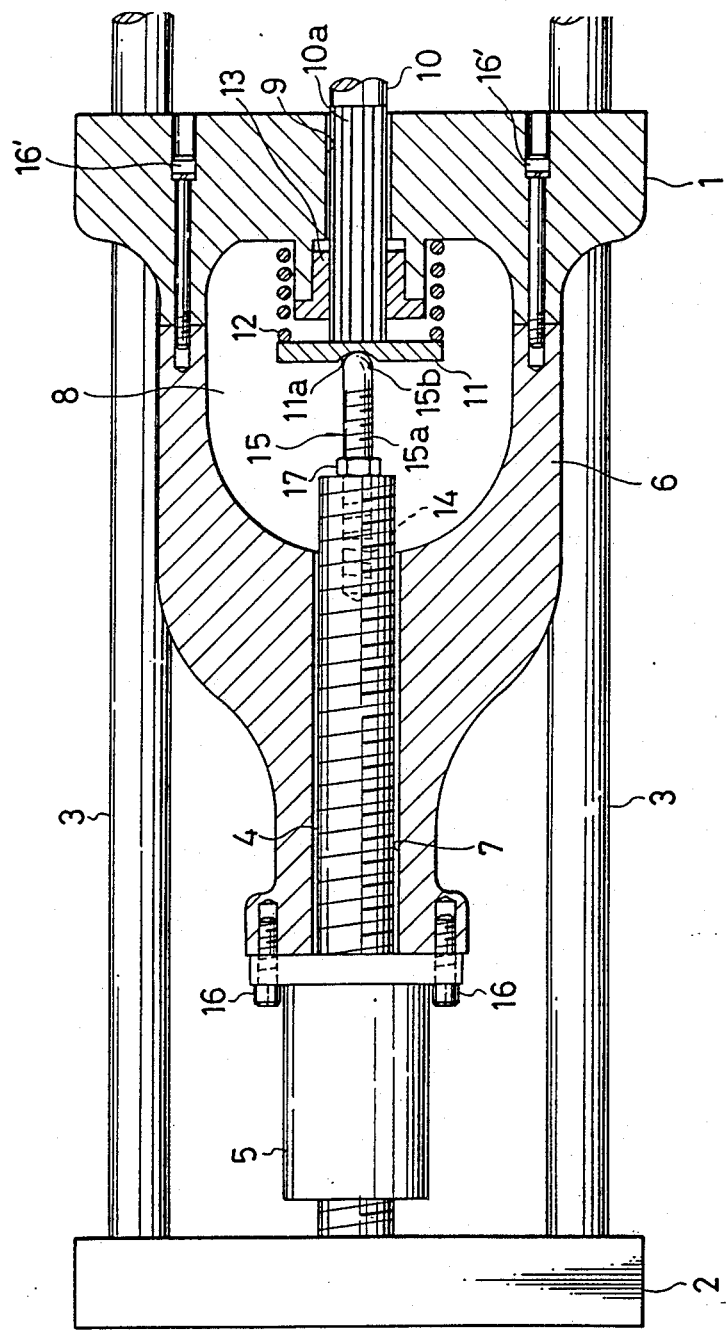

PRODUCT EJECTOR FOR INJECTION MOLDING MACHINE

BACKGROUND OF THE INVENTION

1. Field of the Invention

The present invention relates to product ejectors for use in injection molding machines and, particularly, to a product ejector in a direct-acting type mold clamping system in which a ball screw is driven by a servomotor to move a moving platen fixedly mounted to a ball nut threadedly engaged with the ball screw, thereby carrying out mold clamping.

2. Description of the Art

In an injection molding machine, there is known a product ejector for removing a product from a mold, which is of such a type that, during rearward movement of a moving platen toward a rear platen, a rod fixed to the rear platen pushes an ejector plate, short of a point of time mold opening is completed, to project a product ejector bar fixedly mounted to the ejector plate, toward the mold mounted on the moving platen, thereby ejecting a product from the mold. A product ejector is also known, which is of such a type that a driving source separate from a driving source for a mold clamping system is employed to drive a product ejector bar to project the same, thereby removing a product from a mold.

A direct-acting type mold clamping system also has been developed, in which a ball screw is rotated by a servomotor, to move a moving platen which is movable together with a ball nut threadedly engaged with the ball screw, to thereby carry out mold closing, mold clamping and mold opening.

It is required for the above direct-acting type mold clamping system to set a length of the ball screw supported by a rear platen, to a considerably large value corresponding to a moving stroke of the moving platen. It is also required to prevent the ball screw and the platen from interfering with each other at a position where mold opening is completed. As a result, the spacing distance between the rear platen and the moving platen becomes long. Accordingly, if the rod for pushing the product ejector bar mounted on the side of the moving platen is fixed to the rear platen, the rod becomes long, so that deflection might occur or a problem might arise as to strength. On the other hand, if an attempt is made to carry out driving of the product ejector bar without the use of the long rod, a driving source for ejection of a product is especially required, making the injection molding machine expensive.

SUMMARY OF THE INVENTION

It is therefore an object of the invention to provide a product ejector in a motor-driven, direct-acting type mold clamping system for an injection molding machine, in which an exclusive product can be ejected without the necessity of a driving source and which has a simple structure, and whereby is possible to reduce the length of a rod for transmitting driving force to an ejector bar.

In order to achieve the above-mentioned object, in a product ejector in a direct-acting type mold clamping system in which a ball screw is rotated by a motor to move a moving platen fixedly mounted to a ball nut threadedly engaged with the ball screw, thereby carrying out mold clamping, the arrangement of the invention is such that a rod is mounted on a forward end of the ball screw, an ejector plate is fixedly mounted to an end of an ejector bar on the side of the rod so as to be engageable with the rod. The ejector bar is arranged within a bore provided in the moving platen in such a manner that the ejector bar extends through the bore and is slidable, and a spring is arranged between the ejector plate and the moving platen for biasing the ejector bar toward the ball screw.

As described above, the arrangement of the invention is such that the rod mounted to the forward end of the ball screw extending to a position near the moving platen pushes the ejector bar toward a mold just before completion of mold opening motion of the moving platen, to eject a product from the mold, By virtue of such arrangement, the product can be ejected and removed without the use of a special driving source for ejection of a product and therefore has a simple structure. The rod can be reduced in length so that no particular consideration is required to be given to deflection and strength of the rod.

These, together with other objects and advantages, which will be subsequently apparent, reside in the details of construction and operation as more fully hereinafter described and claimed, reference being made to the accompanying drawing forming a part thereof.

BRIEF DESCRIPTION OF THE DRAWING

The FIGURE is a partially cross-sectional view of a principal portion of a product ejector according to an embodiment of the invention.

DESCRIPTION OF THE PREFERRED EMBODIMENTS

In the FIGURE, the reference numeral 1 denotes a moving platen, and the reference numeral 2 designates a rear platen which is fixedly mounted to a base (not shown) of an injection molding machine. One of a pair of molds (not shown) is mounted on the moving platen 1, and the other mold is mounted on a stationary platen (not shown) which is fixedly secured to the base of the injection molding machine. The moving platen 1 bores (not shown) both edge portions formed therein on are formed therein with respective bores (not shown). Tie bars 3 and 3 extending between the rear platen 2 and the stationary platen are inserted respectively through the bores in the moving platen 1 so that the moving platen 1 is supported for movement along the tie bars 3 and 3 to the right and left as viewed in the FIGURE. The reference numeral 4 denotes a ball screw having an end portion, on the side of the rear platen 2, which is supported by the latter for rotation, but against axial movement. The end portion of the ball screw 4 is connected to a servomotor (not shown) mounted to the rear platen 2. The reference numeral 5 denotes a ball nut threadedly engaged with the ball screw 4. The ball nut 5 has a forward end which is fixedly attached to a rear end of a nut attachment 6 by means of bolts 16. The nut attachment 6 has a forward end which is fixedly mounted to a rear side of the moving platen 1 by means of bolts 16'. The nut attachment 6 has a cylindrical shape, and is formed such that the end of the nut attachment to which the ball nut 5 is attached is small in diameter, while the end of the nut attachment on the side of the moving platen is large in diameter. The nut attachment 6 is formed therein with a bore 7 through which the ball screw 4 passes and which extends along an axis of the nut attachment 6. A large space 8 is provided in the nut attachment 6 on the side of the moving platen.

A product ejector bar 10 has a rearward end which projects into the space 8. The product ejector bar 10 slidably extends through a bore 9 provided in the moving platen 1 and is arranged in coaxial relation to the ball screw 4. An ejector plate 11 is fixedly mounted to the rearward end of the ejector bar. A spring 12 is arranged between the ejector plate 11 and the moving platen 1, for biasing the ejector plate 11 and the ejector bar 10 toward the ball screw 4. A splined section 10a is provided on an outer peripheral surface of a rearward half portion of the ejector bar 10, for preventing rotation of the ejector bar 10 and for guiding axial movement thereof. A spline nut 13 in slidable engagement with the splined section 10a is fixedly mounted to the moving platen 1.

On the other hand, a threaded bore 14 is formed in the forward end portion of the ball screw 4 and extends along an axis thereof. A stroke adjusting rod 15 has a threaded section 15a which is threadedly engaged with the threaded bore 14. Alteration of the threadedly engaging position between the rod 15 and the ball screw 4 enables adjustment of the amount of projection (effective length) of the stroke adjusting rod 15 from the forward end face of the ball screw 4, and correspondingly, the length of the ejection stroke of the ejector bar 10. The stroke adjusting rod 15 has a forward end 15a which is formed into a spherically convex shape. On the other hand, a spherical recess 11a is formed in a portion of the above-mentioned ejector plate 11, which is confronted with the forward end portion 15a. The arrangement is such that when the moving platen 1 is moved rearwardly (to the left as viewed in the FIGURE) to a predetermined position at mold opening, the spherically convex forward end 15b and the spherical recess 11a are brought into engagement with each other. Additionally, the reference numeral 17 denotes a nut for preventing loosening of the stroke adjusting rod 15.

The operation of the ejector according to the embodiment will next be described.

When mold closing and mold clamping are carried out, the servomotor, not shown, is driven rotatively in the normal direction to move the moving platen 1 in the right-hand direction in the FIGURE. On the other hand, when mold opening is carried out, the motor is rotated in the reverse direction to move the moving platen 1 in the left-hand direction in the FIGURE. That is, as the servomotor is driven rotatively in the reverse direction to rotate the ball screw 4 in the reverse direction, the ball nut 5 threadedly engaged with the ball screw 4 is moved in the left-hand direction in the FIGURE along the axis of the ball screw 4. The moving platen 1 is also moved in the left-hand direction in the FIGURE, through the nut attachment 6 fixedly mounted to the ball nut 5, thereby carrying out opening of the mold. Short of completion of the mold opening, the spherically convex forward end 15b of the stroke adjusting rod 15 is abutted against the spherical recess 11a in the ejector plate 11. As the moving platen 1 is further moved in the left-hand direction in the FIGURE toward a position where the mold opening is completed, the forward end 15b of the stroke adjusting rod 15 pushes the ejector plate 11 to move the ejector plate 11 and the ejector bar 10 in the right-hand direction in the FIGURE against the spring 12. As a result, the ejector bar 10 projects into the mold to eject a product therefrom.

Meanwhile, although the stroke adjusting rod 15 rotates with rotation of the ball screw 4, the rotation of the stroke adjusting rod 15 is not transmitted to the ejector plate 11. In addition, since the ejector bar 10 is engaged with the spline nut 13 fixedly mounted to the moving platen 1, through the splined section 10a, the ejector bar 10 is prevented from rotating. Accordingly, the ejector bar 10 does not also rotate. Thus, the ejector bar 10 does not mar a molded article at ejection. Further, if runout occurs on the ball screw 4 with respect to its axis during rotation of the ball screw, or if the stroke adjusting rod 15 is not correctly arranged in coaxial relation to the ball screw 4, the forward end 15b of the rod 15 would move while describing an eccentric circle. However, even if the forward end 15b moves while describing an eccentric circle, engagement of the rod 15 and the ejector plate 11 with each other through the spherically convex forward end 15b and the spherical recess 11a ensures that the ejector plate 11 and the ejector rod 10 are pushed axially by the rod 15 to eject a product. Additionally, the ejection amount of the ejector bar 10, that is, the ejection stroke, is adjusted in such a manner that the threadedly engaging position of the stroke adjusting rod 15 with respect to the ball screw 4 is adjusted to alter the ejection amount of the stroke adjusting rod 15 from the end face of the ball screw 4.

Subsequently, as the moving platen 1 is driven to move in the mold closing direction, the ejector plate 11 leaves the rod 15, so that the ejector plate 11 is returned to the initial position under the spring force of the spring 12.

The above embodiment has been described as utilizing the spline engagement for prevention of rotation of the ejector bar 10 and for guide of movement of the same. In place of the spline engagement, however, either one of the moving platen 1 or the ejector bar 10 may be provided thereon with an elongated projection or projections, and the other may be provided therein with a groove or grooves with which the projection or projections are engaged.

Further, the forward end of the rod 15 and the opposed face of the ejector plate 11 have been described as being formed respectively into the spherically convex and concave shapes, but, in contrast with this, may be formed respectively into concave and convex shapes.

Numerous alterations and modifications of the structure herein disclosed will suggest themselves to those skilled in the art. It is to be understood, however, that the present disclosure relates to the preferred embodiments of the inventon which is for purposes of illustration only and is not to be construed as a limitation of the invention. All such modifications which do not depart from the spirit of the invention are intended to be included within the scope of the appended claims.

We claim:

1. A direct-acting type mold clamping system for an injection machine comprising:
 a stationary rear platen;
 a ball screw rotatably but axially immovably supported by said rear platen;
 means for rotating said ball screw;
 a ball nut threadably engaged with said ball screw;
 a moving platen having a mold mounted thereto;
 means for fixedly connecting said ball nut to said moving platen, said ball nut being unrotatable with respect to said ball screw whereby rotation of said ball screw effects movement of said moving platen to carry out mold clamping and unclamping; and a mold product ejector, said product ejector comprising:

a rod mounted to a rearward end of said ball screw;

an ejector bar arranged within a bore provided in said moving platen such that the ejector bar extends through the bore and is slidable therein to project into the mold and eject a product therefrom;

an ejector plate fixedly mounted to an end of said ejector bar and engageable with said rod upon movement of said moving platen; and a spring positioned between said ejector plate and said moving platen, for biasing said ejector bar toward said ball screw.

2. A mold clamping system for an injection molding machine according to claim 1, wherein one of a forward end of said rod and a face of said ejector plate is formed into a spherically convex shape, and the other is formed therein with a spherical recess engageable with and disengageable from said spherical convex shape.

3. A mold clamping system for an injection molding machine according to claim 1, wherein said rod is mounted so as to be adjustable in its effective length.

4. A mold clamping system for an injection molding machine according to claim 3, wherein said forward end of said ball screw is formed with a threaded bore, and said rod has a threaded section threadedly engaged with said threaded bore, so that said rod is adjustable lengthwise with respect to said ball screw.

5. A mold clamping system for an injection molding machine according to claim 1, including a spline nut fixedly mounted to said moving platen, wherein said ejector bar has, on its outer peripheral surface, a splined section engaged with said spline nut, said ejector bar being supported by said spline nut so as to be unable to rotate, but to be slidably therein.

6. A mold clamping system for an injection molding machine to claim 1, wherein said motor is a servomotor.

7. A mold clamping system for an injecting molding machine according to claim 2, wherein said rod is mounted so as to be adjustable in its effective length.

8. A mold clamping system for an injecting molding machine according to claim 7, wherein said forward end of said ball screw is formed with a threaded bore, and said rod has a threaded section threadedly engaged with said threaded bore, so that a threadedly engaging position between said rod and said threaded bore is adjustable.

9. A mold clamping system for an injecting molding machine according to claim 2, including a spline nut fixedly mounted to said moving platen, wherein said ejector bar has, on its outer peripheral surface, a splined section engaged with said spline nut, said ejector bar being supported by said spline nut so as to be unable to rotate, but to be slidable.

10. A mold clamping system for an injection molding machine according to claim 2, wherein said motor is a servomotor.

11. A mold clamping system for an injection molding machine according to claim 4, including a spline nut fixedly mounted to said moving platen, wherein said ejector bar has, on its outer peripheral surface, a splined section engaged with said spline nut, said ejector bar being supported by said spline nut so as to be unable to rotate, but to be slidable.

12. A product ejector for an injection molding machine according to claim 8, including a spline nut fixedly mounted to said moving platen, wherein said ejector bar has, on its outer peripheral surface, a splined section engaged with said spline nut, said ejector bar being supported by said spline nut so as to be unable to rotate, but to be slidable.

13. A mold clamping system for an injection molding machine according to claim 1, wherein said rod projects from the front end of said ball screw toward said ejector plate by a predetermined length which is set to a value sufficient to bring said rod in engagement with said ejector plate when said moving platen reaches a position short of completion of mold opening.

14. A mold clamping system for an injecting molding machine according to claim 13, wherein said predetermined length of said rod is of short enough length to eliminate any substantial deflection of said rod during operation.

* * * * *

UNITED STATES PATENT AND TRADEMARK OFFICE
CERTIFICATE OF CORRECTION

PATENT NO. : 4,891,002
DATED : January 2, 1990
INVENTOR(S) : YOSHIHARU INABA et al.

It is certified that error appears in the above-identified patent and that said Letters Patent is hereby corrected as shown below:

[57] ABSTRACT - "inteposed" should be --interposed--.
    Column 1, line 57, delete "an exclusive" and insert --a--;
              line 58, delete "a' and insert --an exclusive--;
              line 59, delete "and"; after "whereby" insert --it--.
    Column 2, line 14, after "mold" the comma "," should be a period --.--;
              line 42, after "1" insert --has--;
              line 43, delete "both edge portions", delete "are";
              line 44, delete "formed therein with respective bores (not shown)" and insert --both edge portions--.
    Column 5, line 41, after "machine" insert --according--;
              line 42, "injecting" should be --injection--.

UNITED STATES PATENT AND TRADEMARK OFFICE
CERTIFICATE OF CORRECTION

PATENT NO. : 4,891,002

DATED : January 2, 1990

INVENTOR(S) : Yoshiharu Inaba, et al.

It is certified that error appears in the above-identified patent and that said Letters Patent is hereby corrected as shown below:

Column 6, line 1, "injecting" should be --injection--;

Column 6, line 9, "injecting" should be --injection--' line 39, "injecting" should be --injection--.

Signed and Sealed this

Twenty-ninth Day of January, 1991

*Attest:*

HARRY F. MANBECK, JR.

*Attesting Officer*      *Commissioner of Patents and Trademarks*